(12) United States Patent
Bykov

(10) Patent No.: US 11,443,195 B2
(45) Date of Patent: Sep. 13, 2022

(54) DOMAIN-BASED DENDRAL NETWORK

(71) Applicant: Volodymyr Bykov, Kahului, HI (US)

(72) Inventor: Volodymyr Bykov, Kahului, HI (US)

( * ) Notice: Subject to any disclaimer, the term of this patent is extended or adjusted under 35 U.S.C. 154(b) by 393 days.

(21) Appl. No.: 16/795,569

(22) Filed: Feb. 19, 2020

(65) Prior Publication Data

US 2020/0265319 A1    Aug. 20, 2020

Related U.S. Application Data

(60) Provisional application No. 62/807,365, filed on Feb. 19, 2019.

(51) Int. Cl.
*G06N 3/08* (2006.01)
*G06N 20/10* (2019.01)
*G06N 3/063* (2006.01)

(52) U.S. Cl.
CPC ............. *G06N 3/088* (2013.01); *G06N 3/063* (2013.01); *G06N 20/10* (2019.01)

(58) Field of Classification Search
CPC ......... G06N 3/088; G06N 20/10; G06N 3/063
See application file for complete search history.

(56) References Cited

U.S. PATENT DOCUMENTS

| | | | |
|---|---|---|---|
| 6,332,137 B1 * | 12/2001 | Hori ......................... | G06N 3/02 706/14 |
| 8,154,993 B2 * | 4/2012 | Lichtwald ............... | H04L 45/22 370/225 |
| 10,496,884 B1 * | 12/2019 | Nguyen ................ | G06K 9/6272 |
| 2020/0265319 A1 * | 8/2020 | Bykov .................... | G06N 3/088 |

FOREIGN PATENT DOCUMENTS

| | | | |
|---|---|---|---|
| CN | 105122278 B | * 3/2017 | ............ G06N 3/049 |
| CN | 105122278 B | 3/2017 | |
| CN | 109858620 A | 6/2019 | |

OTHER PUBLICATIONS

Bykov, "Domain-Based Dendral Network", https://medium.com/ozolio/ozolio-introduces-domain-based-dendral-network-cf76be5eafd7.

* cited by examiner

*Primary Examiner* — Paulinho E Smith

(57) ABSTRACT

A domain-based dendral network allows an artificial neural network to learn autonomously without any back-propagation algorithms or human supervision. An input bus transmits an input pattern to be analyzed into a neural network, which is composed of one of more neuron layers composed of multiple neurons, which perform analyze data propagated through the neural network with the aid of dendrons performing low-level signal analysis. An output bus collects the resulting output pattern from the neural network and sends the output pattern to a pattern comparator. The pattern comparator produces a tuning pattern by comparing the output pattern to a control pattern, and the timing pattern is sent to a tuning bus, which distributes the tuning pattern across the neural network according to a domain routing method. The use of the uniform routing method and the domain routing method facilitates the advantages of the present invention.

10 Claims, 4 Drawing Sheets

DOMAIN-BASED DENDRAL NETWORK

The current application claims a priority to the U.S. Provisional Patent application Ser. No. 62/807,365 filed on Feb. 19, 2019.

FIELD OF THE INVENTION

The present invention relates generally to artificial intelligence. More particularly, the present invention is a method for artificial intelligence applicable to any product or technology that performs analytic tasks, normally attributed to Machine Learning.

BACKGROUND OF THE INVENTION

The conventional artificial Neural Network is based on the Perceptron concept, which was introduced by Frank Rosenblatt in 1957. The Rosenblatt's model was significantly improved since 1957. Nowadays, the most popular models of artificial Neural Network implement the Machine Learning using back-propagation (backpropagation). The back-propagation is a process of adjusting Neural Network algorithmically in order to obtain a desired result. This simple description of the back-propagation also describes the main problem of such approach. The back-propagation algorithm must consist of heavy calculations that carry significant portion of knowledge about the task. In other words, the programmer who implements the algorithm decides which part of Neural Network should be adjusted and how to perform this adjustment. In other words, the learning capabilities of Neural Network depend on human intelligence. This fundamental logical collision makes implementation of autonomous Neural Network (capable to learn without human supervision) nearly impossible. Such type of autonomous learning is known as "Unsupervised learning" or "Learning without teacher". The Domain Based Dendral Network solves this collision and allows artificial Neural Network to learn autonomously without any back-propagation algorithms or human supervision.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is an autonomous artificial neural network and may be referred to hereinafter as the Domain Based Dendral Network (DBDN). The DBDN is a principally new model of Artificial Neural Network, which does not use any training techniques that are based on algorithmic adjustment of a Neural Network (such as back-propagation). The DBDN is designed for development of complex AI applications that do not require any human supervision during training session. Moreover, DBDN makes the term "Training Session" obsolete, because DBDN can learn continuously. In order to achieve such result DBDN uses new approach called Domain Based Tuning (DBT). This approach is based on the idea that autonomous Neural Network should naturally form groups of neurons (Domains). Each Domain in the DBDN accumulates knowledge about a particular pattern or class of patterns. The learning capabilities of DBDN do not depend on complexity of the training algorithm or perfection of training procedure. In contrast with conventional Neural Networks, DBDN is learning because all elements of the network are connected properly and every element is functioning in conformity with general concept, but NOT because some smart algorithm (such as back-propagation) makes the right decisions during a training session.

Figure 1:
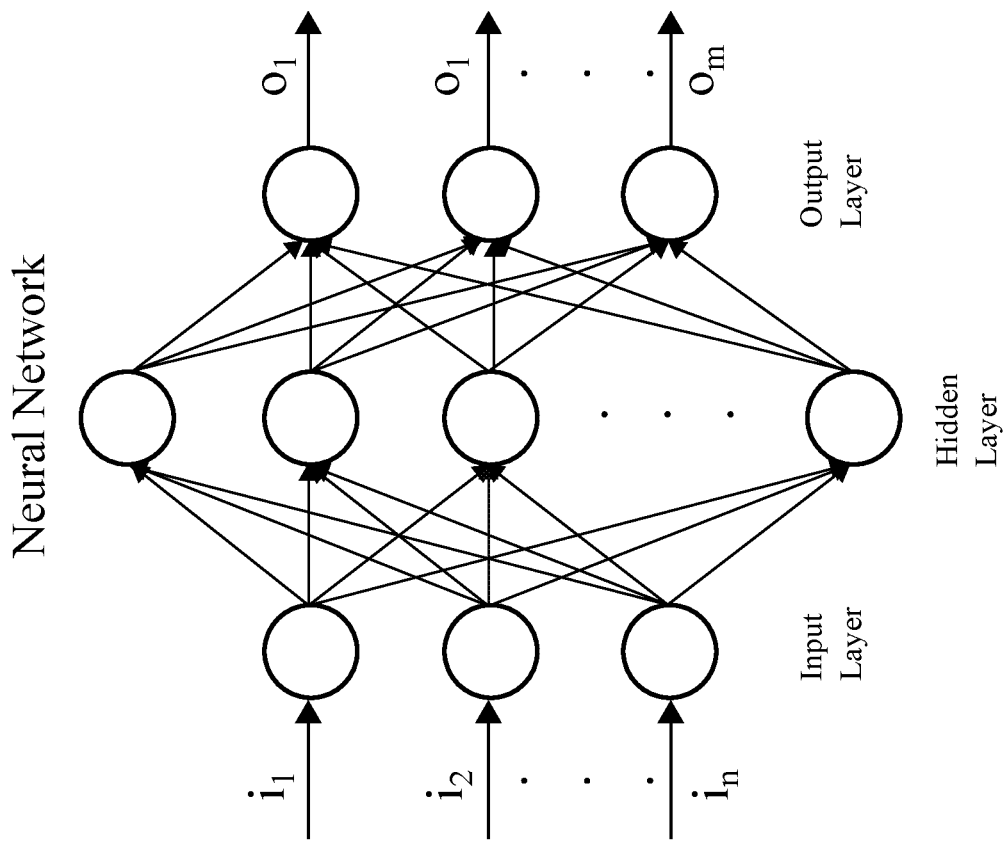
FIG. 1 is a schematic diagram illustrating conventional models of Artificial Neuron and Neural Network in relation to the present invention.
Figure 1:
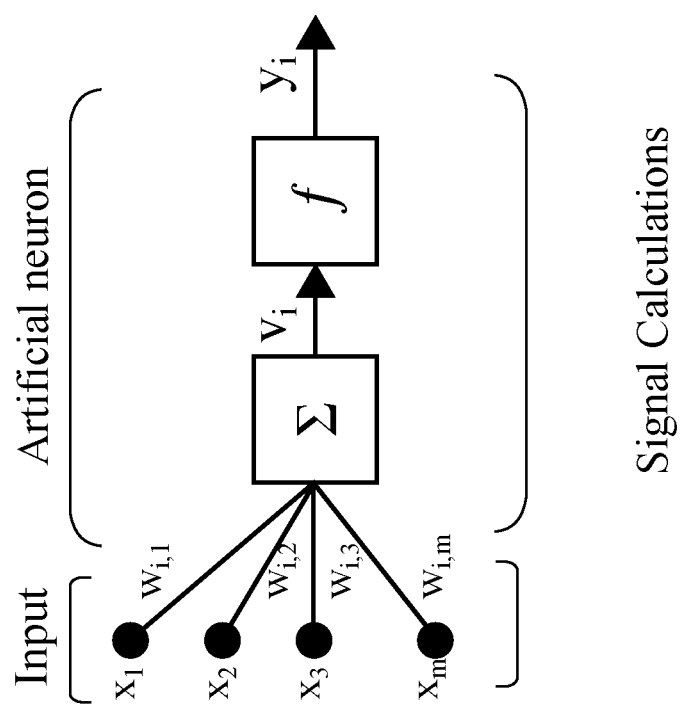
Figure 2:
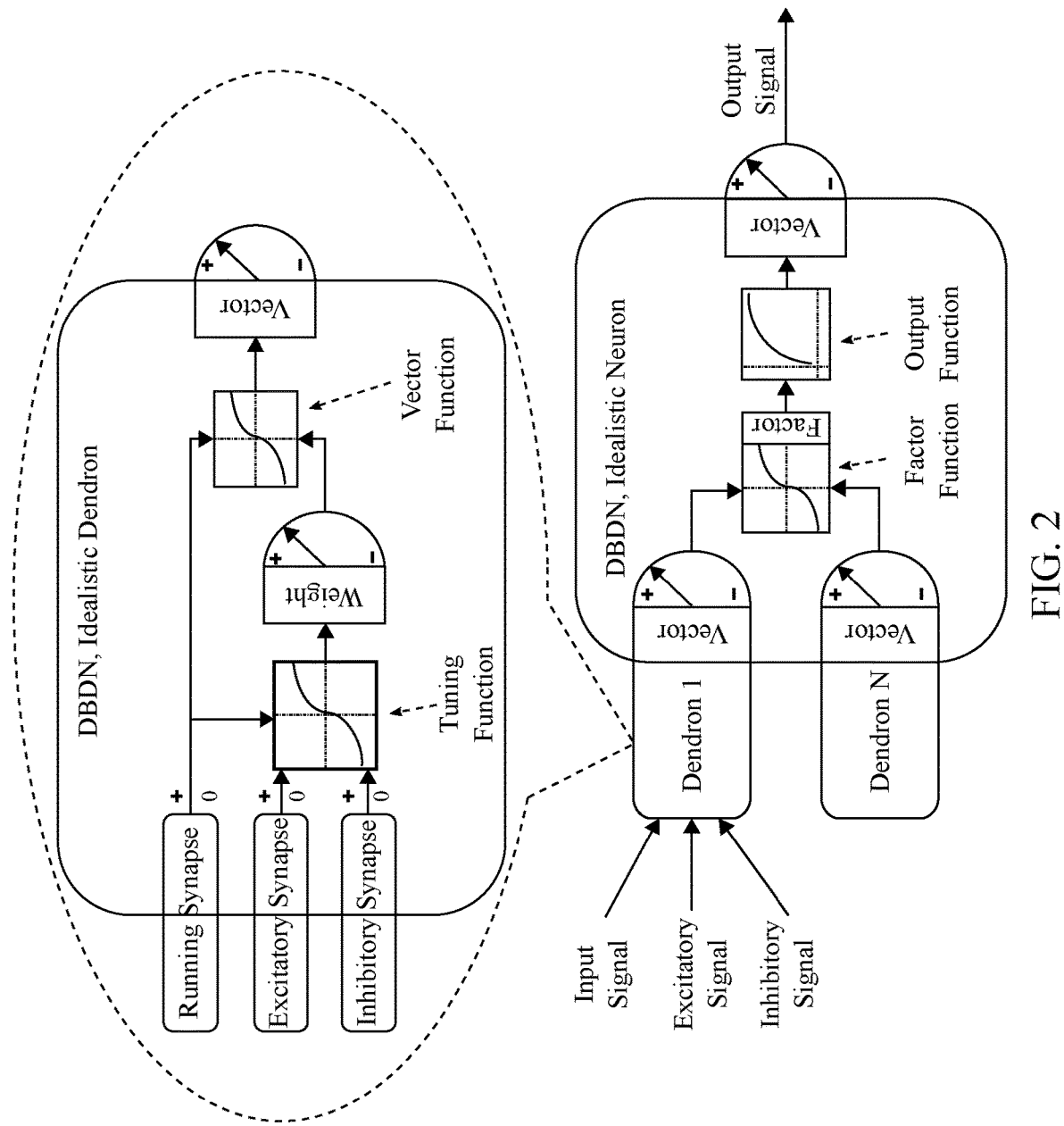
FIG. 2 is a schematic diagram illustrating an idealistic model of Artificial Neuron in Domain Based Dendral Network in relation to the present invention.
Figure 3:
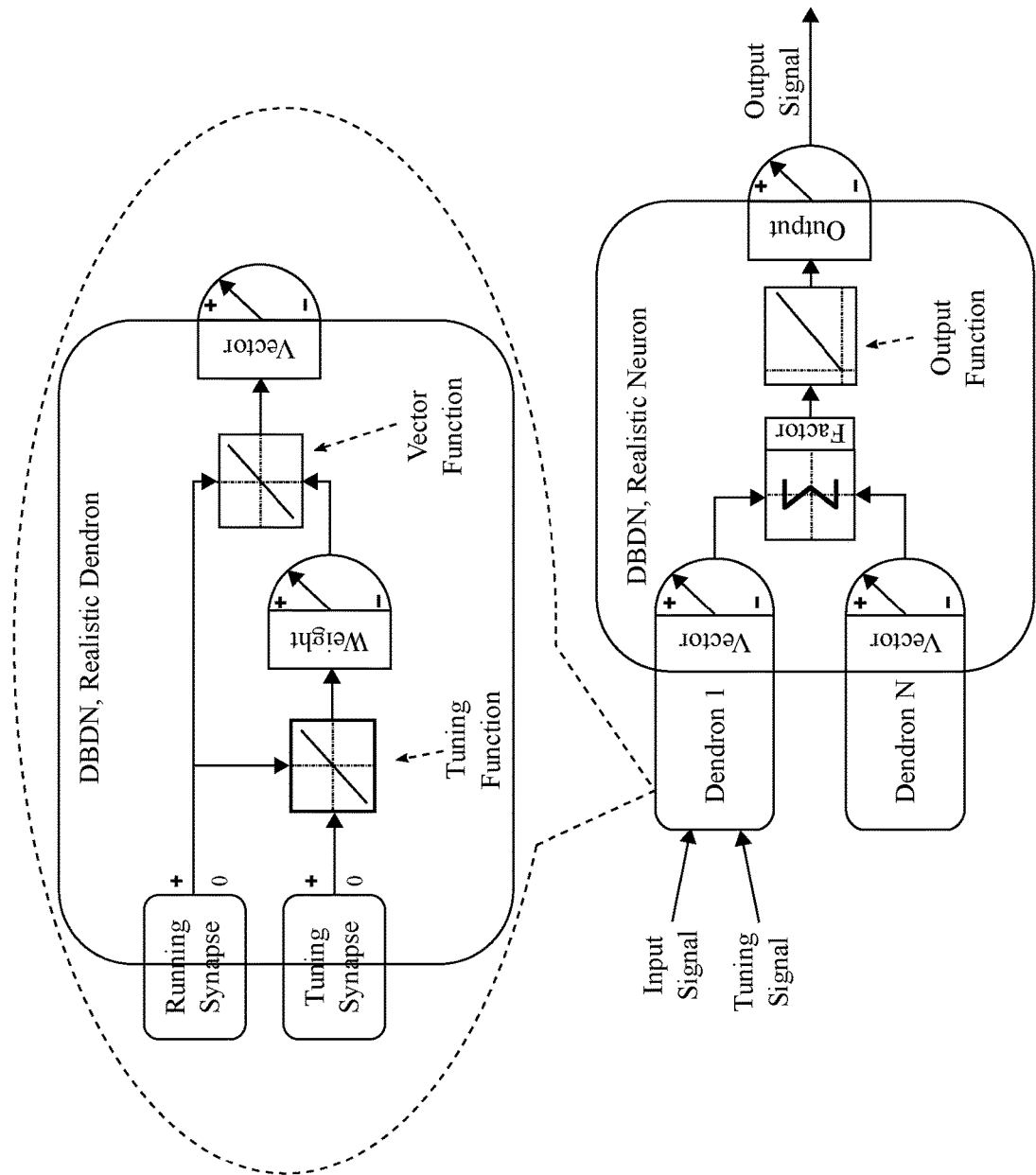
FIG. 3 is a schematic diagram illustrating a realistic model of Artificial Neuron in Domain Based Dendral Network in relation to the present invention.
Figure 4:
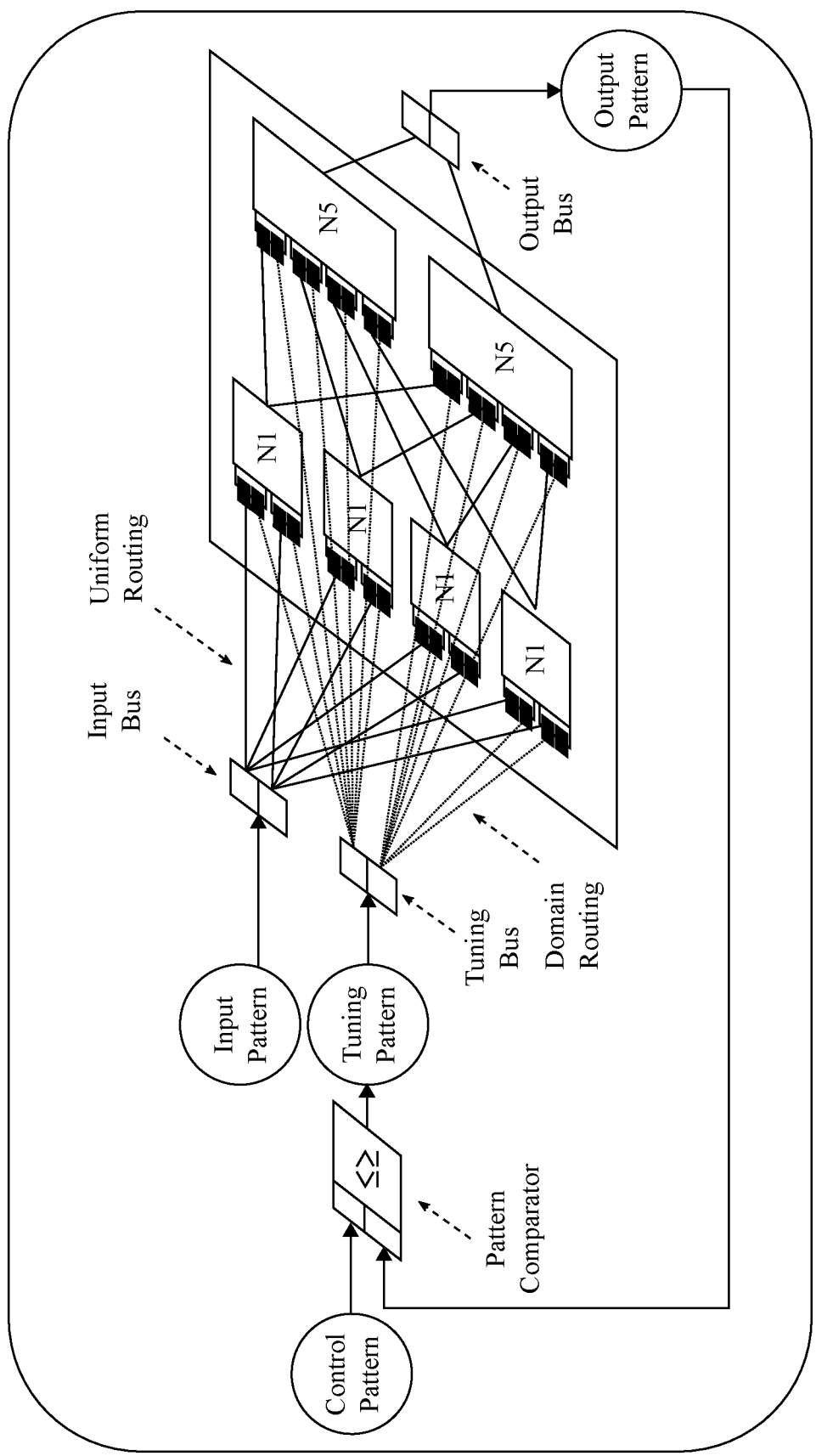
FIG. 4 is a schematic diagram illustrating a functional schema of Domain Based Dendral Network in relation to the present invention.

Referring to FIGS. 1-4, in general, the present invention comprises a neural network, an input bus, an output bus, a pattern comparator, and a tuning bus. FIG. 1 illustrates a conventional model of an artificial neuron and neural network in relation to the present invention. The neural network comprises at least one neuron layer, as illustrated in FIG. 4, and each of the at least one neuron layer comprises a plurality of neurons. An artificial neuron, or neuron, throughout, is an element that represents a core signal processing unit in the present invention. "The at least one neuron layer" may be understood herein to refer to a group of entities, each entity in the group being a neuron layer, the number of neuron layers in the group being not less than one, but otherwise unrestricted unless explicitly stated. In practice it is likely for the neural network of the present invention to comprise many neuron layers, or a plurality of neuron layers.

A neuron layer is a set of neurons with identical capabilities and identical behavior. In general, the neural network is made up of multiple neurons which are subdivided into neuron layers, each neuron being associated with multiple dendrons which perform low level signal analysis, the results of which are passed to their associated neuron for further computation. The present invention may, however, conceivably only have a single neuron layer without departing from the intended spirit and scope of the present invention. It should be noted herein that the particular arrangement of neurons and neuron layers, in addition to the arrangement of communicative channels between and among the neurons, neuron layers, dendrons, and any other various elements of the neural network, while in some instances may be considered preferable or advantageous in various arrangements or embodiments, are ultimately not of particular concern to the spirit and scope of the present invention as disclosed herein.

Each of the plurality of neurons comprises, or is otherwise associated with, a plurality of dendrons. FIGS. 2 and 3 illustrate an idealistic model and a realistic model, respectively, of an artificial neuron and its associated dendrons in relation to the present invention. An artificial dendron, or dendron, is an element that contains multiple different synapses, which are elements that receive a particular type of signal. Each of the plurality of dendrons is configured to receive at least one neural signal, process the at least one neural signal, and output a dendral vector based on the processing.

Each of the plurality of neurons is configured to receive a plurality of dendral vectors from the plurality of dendrons, process the plurality of dendral vectors, and output an output signal based on the processing.

The present invention comprises multiple "signal buses." In the context of the present invention, a signal bus is an element that buffers a set of neural signals. Other elements in the system can read signals from or write signals to a signal bus.

The input bus is communicably coupled with the neural network. More particularly, the input bus is configured to receive an input pattern and distribute the input pattern within the at least one neuron layer according to a uniform routing method, wherein a given set of signals is distributed within a given neuron layer in the uniform routing method. A routing method is a distribution method of neural signals in a neural layer. It should be noted that each routing method defines a specific receiving scope, but does not restrict the distribution algorithm. There are variety of algorithms that can be utilized in order to distribute signals within a layer or domain. The input pattern is a set of signals that may represent any relevant type of information which can be analyzed by the present invention, such as, but not limited to, an image, a sound, or any other external input that should be analyzed by the neural network.

The output bus is communicably coupled between the neural network and the pattern comparator. More particularly, the output bus is configured to receive an output pattern from the neural network and transmit the output pattern to the pattern comparator.

The pattern comparator is communicably coupled between the output bus and the tuning bus. The pattern comparator is configured to receive the output pattern and a control pattern, process the output pattern and the control pattern, and produce a tuning pattern based on the processing.

The tuning bus is communicably coupled between the pattern comparator and the neural network. Furthermore, the tuning bus is configured to receive the tuning pattern from the pattern comparator and distribute the tuning pattern within at least one domain of the neural network, wherein the tuning pattern is distributed within the neural network according to a domain routing method, wherein each of the at least one domain is associated with at least one domain member neuron from the plurality of neurons of at least one of the at least one neuron layer, and wherein each of the at least one domain is associated with a specified class of patterns.

A domain represents a group of neurons in a layer. How neurons in a layer are assigned to a particular domain depends on domain routing method. Take for example layer with 10 neurons, and the current domain routing method (considering number of tuning signals) forms two domains per layer. So, in a simplest scenario, the first five neurons will represent a first domain, and second five neurons will represent a second domain. In other words, distribution of neurons and size of a domain depends on the domain routing method and number of tuning signals. Each domain accumulates knowledge about a particular class of patterns. In other words, if the network contains two domains only, then it can learn two classes of patterns.

In the preferred embodiment of the present invention, the at least one neuron layer of the neural network comprises a plurality of neuron layers, the plurality of neuron layers comprising a first neuron layer and a last neuron layer.

The plurality of neuron layers is communicably coupled with each other. In some embodiments, the plurality of neuron layers is communicably and sequentially coupled with each other from the first neuron layer to the last neuron layer. It may be understood herein that in various embodiments of the present invention, various different arrangements of lines of communication among the plurality of neuron layers and their constituent neurons and dendrons may be utilized.

The neural network may comprise any number of neuron layers between the first neuron layer and the last neuron layer. An arbitrary neuron layer from the plurality of neuron layers is utilized for generalization of intermediate neuron layers between the first neuron layer and the last neuron layer. The arbitrary neuron layer from the plurality of neuron layers is communicably coupled with a subsequent neuron layer from the plurality of neuron layers. The arbitrary neuron layer is configured to distribute a plurality of output signals within a subsequent neuron layer according to the uniform routing method.

The subsequent neuron layer is configured to receive the plurality of output signals, process the plurality of output signals, and output an altered plurality of output signals based on the processing.

As previously mentioned, the input bus is communicably coupled with the neural network. More particularly, since the input bus acts as the primary entrance point of data to be analyzed by the neural network, the input bus is communicably coupled with the first neuron layer. Furthermore, the input bus is configured to receive an input pattern and distribute the input pattern within the first neuron layer according to the uniform routing method.

Just as the input bus facilitates entry into the neural network, the output bus serves as the exit from the neural network. The output bus is communicably coupled between the last neuron layer and the pattern comparator. The output bus is configured to receive an output pattern from the last neural layer and transmit the output pattern to the pattern comparator. The tuning bus is configured to receive the tuning pattern from the pattern comparator and distribute the tuning pattern within at least one domain of the neural network, wherein the tuning pattern is distributed within the neural network according to the domain routing method, and wherein each of the at least one domain is associated with at least one domain member neuron from the plurality of neurons of at least one of the plurality of neuron layers.

The uniform routing method requires that a source of a running signal (input pattern or neural layer) must send each signal to all neurons in a receiving neural layer. This means that the number of receivers (dendrons) in each neuron of the receiving neural layer should be equal to number of signals in the source of the running signal.

The domain routing method requires that number of domains in each neural layer must be equal to number of the tuning signals received by the network. Therefore, the size of a domain (number of dendrons that must be reached by each tuning signal in a particular layer) should be calculated. It is the combination of the uniform routing method and the domain routing method that is the primary focus of the present invention, and that facilitates the advantages of the present invention.

In some embodiments, the at least one neural signal comprises an input signal and at least one tuning signal. Each of the plurality of dendrons comprises a running synapse and at least one tuning synapse. Each of the plurality of dendrons is configured to receive the input signal through the running synapse and at least one tuning signal through the at least one tuning synapse, process the input signal and the tuning signal(s), and output the dendral vector.

More particularly, in some embodiments, the least one tuning synapse comprises an excitatory synapse and an inhibitory synapse. Each of the plurality of dendrons is further configured to receive an excitatory signal as one of the at least one tuning signals through the excitatory synapse and an inhibitory signal as one of the at least one tuning signals through the inhibitory synapse. Each of the plurality of dendrons is further configured to processes the input signal and the excitatory synapse, if the excitatory synapse is received, and to process the input signal and the inhibitory synapse, if the inhibitory synapse is received, and to output the dendral vector based on the processing.

Each of the plurality of dendrons is configured to process the input signal and the at least one tuning signal with a tuning function in order to produce a dendral weight, and to subsequently process the dendral weight with a vector function in order to produce the dendral vector.

The plurality of neurons of the arbitrary neuron layer comprises an arbitrary neuron, which may represent any neuron in the plurality of neurons in the arbitrary neuron layer. The arbitrary neuron is configured to receive a plurality of dendral vectors from the plurality of dendrons of the arbitrary neuron, process the plurality of dendral vectors, and to output a signal to the subsequent neuron layer based on the processing.

Moreover, the arbitrary neuron is configured to process the plurality of dendral vectors with a factor function in order to produce a neural factor, and to process the neural factor with an output function in order to produce the output signal. Furthermore, in some embodiments, the arbitrary neuron is configured to process the plurality of dendral vectors with a factor function in order to produce the neural factor.

The input pattern comprises a plurality of running signals. Running signals represent "cognitive information" or information to be used in analysis—inputs or outputs. The input bus is configured to distribute the plurality of running signals of the input pattern within the plurality of dendrons of the plurality of neurons of the first neuron layer according to the uniform routing method. The arbitrary neuron layer is configured to receive and process the plurality of running signals, alter the plurality of running signals based on the processing, and distribute the plurality of running signals within the plurality of dendrons of the plurality of neurons of the subsequent neural layer according to the uniform routing method.

The tuning pattern comprises a plurality of tuning signals. The tuning bus is configured to distribute the tuning signals of the tuning pattern within the plurality of dendrons of each of the at least one domain member neuron of the at least one domain, according to the domain routing method.

The following is an alternative description of the present invention that is not intended to be limiting, but rather to further illustrate and exemplify the spirit and scope of the present invention.

The preferred embodiment of the present invention may be referred to hereinafter as the "Domain Based Dendral Network (DBDN)". The Domain Based Dendral Network (DBDN) is a principally new model of Artificial Neural Network, which does not use any training techniques that are based on algorithmic adjustment of a Neural Network (such as back-propagation). The DBDN is designed for development of complex AI applications that do not require any human supervision during training sessions. Moreover, DBDN makes the term "Training Session" obsolete, because DBDN can learn continuously. In order to achieve such a result, DBDN uses a new approach called Domain Based Tuning (DBT). This approach is based on the idea that an autonomous Neural Network should naturally form groups of neurons (Domains). Each Domain in the DBDN accumulates knowledge about a particular pattern or class of patterns. The learning capabilities of DBDN do not depend on complexity of the training algorithm or perfection of training procedure. In contrast with conventional Neural Networks, DBDN is learning because all elements of the network are connected properly and every element is functioning in conformity with the general concept, but NOT because some smart algorithm (such as back-propagation) makes the right decisions during training sessions.

Problem Description:

Most conventional artificial Neural Networks are using back-propagation algorithms in order to obtain a desired result. Therefore, learning capabilities of conventional Neural Networks depend on human intelligence. This problem is a direct result of an incomplete model of Artificial Neurons.

As seen in FIG. 1, the model describes how the input signal enters the synapse and how the neuron calculates the output signal based on synaptic weights. However, this model does not describe how and when the synaptic weight should be adjusted, which is essentially the main goal of the training. Therefore, the decision to use a special algorithm, such as back-propagation, is pretty obvious for this particular paradigm. It is also worth mentioning that some modern models contain additional parameters, such as Neuron Bias, but none of these small alterations allow elimination of back-propagation.

Extensions of Conventional Model:

In order to describe Domain Based Tuning (DBT), the DBDN model introduces several new elements and definitions such as Artificial Dendron, Signal Bus, Signal Routing, etc. This is very important to understand that DBT can be described and implemented using different terminology. The basic principal of DBT, however, remains unique independently on implementation.

Basic Terminology of DBDN:
1. "Artificial Neuron" (Neuron) is an element that represents a core Signal processing unit.
2. "Neural Layer" (Layer) is a set of Neurons with identical capabilities and identical behavior.

3. "Neural Domain" (Domain) is a group of Neurons within Neural Layer that accumulates knowledge about a particular pattern or class of patterns.
4. "Dendral Network" (Network) is an artificial Neural Network that was created using DBDN model. Dendral Network consists of several Neural Layers.
5. "Neural Signal" (Signal) is a specific number (signed or unsigned) that represents an elementary portion of data that can be transferred within the Dendral Network. The DBDN operates with two types of Signals:
   a. "Running Signal" is a Signal that represents cognitive information. Neuron operates with two sub-types of such Signal:
      i. "Input Signal"—is a Running Signal that a Dendron receives though a Running Synapse.
      ii. "Output Signal"—is a Running Signal that a Neuron produces, based on the current status of all enclosed Dendrons.
   b. "Tuning Signal" is a Signal that can adjust a Dendral Weight. A Neuron operates with two sub-types of such Signal:
      i. "Excitatory Signal"—is a Tuning Signal that increases Dendral Weight.
      ii. "Inhibitory Signal"—is a Tuning Signal that decreases Dendral Weight.

Please note that the two sub-types of Tuning Signal are presented in Idealistic Model of Artificial Neuron only. The Realistic Model of Artificial Neuron combines these signals into a single Tuning Signal in which a positive value represents an Excitatory Signal, and a negative value represents an Inhibitory Signal.

6. Artificial Synapse (Synapse) represents an entry point for a particular type of Signal.
7. "Artificial Dendron" (Dendron) is an element that contains several different Synapses. Each synapse receives particular type of signal:
   a. "Running Synapse" is an entry point for Running Signals.
   b. "Tuning Synapse" is an entry point for Tuning Signals. Idealistic Model of Artificial Neuron also defines two subtypes of Tuning Synapse:
      i. "Excitatory Synapse" is an entry point for Excitatory Signals.
      ii. "Inhibitory Synapse" is an entry point for Inhibitory Signals.

Please note that such separation is not necessary in Realistic Model of Artificial Neuron, in which Excitatory Signal and Inhibitory Signal are combined into a single Tuning Signal.

8. "Dendral Weight" (Weight) is a measure of the contribution of an Input Signal to the Dendral Vector.
9. "Dendral Vector" (Vector) is a measure of the contribution of a Dendron to the Neural Factor.
10. "Neural Factor" (Factor) is a measure of the contribution of a Neuron to its Output Signal.
11. "Tuning Function" is a mathematical function that calculates Dendral Weight.
12. "Vector Function" is a mathematical function that calculates Dendral Vector.
13. "Factor Function" is a mathematical function that calculates the Neural Vector.
14. "Output Function" is a mathematical function that calculates Output Signal.
15. "Signal Bus" is an element that buffers a set of Neural Signals. Other elements can read signals from a Signal Bus or write signals into it.
16. "Routing Method" is a distribution method of Neural Signals in a Neural Layer. DBDN defines two routing methods:
    a. "Uniform Routing" is a method that distributes signals within a receiving Layer.
    b. "Domain Routing" is a method that distributes signals within a receiving Domain.

Each Routing Method defines a specific receiving scope but does not restrict the distribution algorithm. There are variety of algorithms that can be utilized in order to distribute signals within Layer or Domain.

17. "Input Pattern" is a set of signals that represent a picture, sound or any other external input that should be analyzed by the Network.
18. "Output Pattern" is a set of signals that the Network actually produces in response to the Input Pattern.
19. "Control Pattern" is a set of signals that the Network should produce in response to the Input Pattern.
20. "Tuning Pattern" is a result of comparison of Output Pattern and Control Pattern.
21. "Pattern Comparator" is an element that calculates the difference between the Output and Control Patterns.

Core Differences from Conventional Model:

Conventional Neural Network (NN) defines Synapse as an element that is attached to a Neuron. The conventional Synapse receives the signal, holds a synaptic Weight, and determines contribution of Input Signal to Output Signal. DBDN defines synapse as a passive entry point only. The Weight and the rest of the logic related to a Signal has been moved to the Dendron, which contains several different synapses.

While most AI researches are aware of different types of synapses in a biological Neuron, conventional model of NN does not define any types of Artificial Synapses. DBDN draws a strong line between Tuning Synapses and Running Synapses.

Conventional model of NN does not define any particular training procedure. Moreover, it cannot define any such procedure due to logical incompletion. DBDN defines a strong and unambiguous logic that allows the Network to learn autonomously.

Idealistic Model of Artificial Neuron:

The Idealistic Model is a representation of a Neuron and its sub-elements in a form that is easier for understanding and mathematical modelling. Real implementation of the Neuron can use some approximations that do not conflict with the general DBDN concept.

The Idealistic Model, shown in FIG. 2, allows us to implement three separated low-level workflows:
1. Signal Analysis workflow:
   a. The Running Synapse receives an Input Signal.
   b. The Dendron calculates a Vector using a sigmoid Vector Function.
   c. The Neuron calculates a Factor using a sigmoid Factor Function.
   d. The Neuron calculates an Output Signal using a sigmoid Output Function.
2. Excitatory Tuning workflow:
   a. The Excitatory Synapse receives an Excitatory Signal.
   b. The Dendron increases the current Weight using a sigmoid Tuning Function.
3. Inhibitory Tuning workflow:
   a. The Inhibitory Synapse receives an Inhibitory Signal.
   b. The Dendron decreases the current Weight using a sigmoid Tuning Function.

Realistic Model of Artificial Neuron:

The Realistic Model of Artificial Neuron simplifies the Idealistic Model of Artificial Neuron, using several approximations discovered during experiments with the Idealistic Model.

The Realistic Model, shown in FIG. 3, reduces number of low-level workflows and simplifies calculations:
1. Signal Analysis workflow.
   a. The Running Synapse receives an Input Signal.
   b. The Dendron calculates a Vector using a linear Vector Function.
   c. The Neuron calculates a Factor using a linear Factor Function.
   d. The Neuron calculates an Output Signal using a linear Output Function.
2. Weight Tuning workflow:
   a. The Tuning Synapse receives a Tuning Signal.
   b. The Dendron adjusts the current Weight using a linear Tuning Function.

Functional Schema of Dendral Network:

Functional Schema of Dendral Network, shown in FIG. 4, describes two high-level workflows:
1. Pattern Analysis workflow:
   a. The Input Bus receives an Input Pattern that consists of Running Signals.
   b. Running Signals are being distributed to the first layer, using a Uniform Routing.
   c. Every receiving Dendron performs the low-level Signal Analysis.
   d. Running Signals are being distributed to the next layer, using a Uniform Routing.
   e. Steps in Signal Analysis Workflow steps c and d should be repeated until the Signal reaches the last Layer.
   f. Output Bus receives an Output Pattern from the last Layer.
2. Network Tuning workflow.
   a. The Pattern Comparator receives Output Pattern from the Output Bus.
   b. The Pattern Comparator receives Control Pattern from external source.
   c. The Tuning Bus receives a Tuning Pattern from Pattern Comparator.
   d. Tuning Signals are distributed across the network using a Domain Routing.
   e. Every receiving Dendron performs the low-level Weight Tuning.

Mathematical Functions:

The following functions were used for experiments with Idealistic and Realistic Models of Artificial Neuron. It should be understood herein that the following functions are considered to be exemplary and in no way limiting to the spirit and scope of the present invention. Use of the following exemplary functions is not necessarily unique, and the following exemplary functions are not the only methods that can be used to implement DBDN model.
1. Idealistic Functions:
   a. Vector Function:

$$V = \frac{2}{1 + e^{-4(W \cdot Si)}} - 1$$

WHERE:
   V—Dendron Vector (−1 . . . 1).
   W—Dendron Weight (−1 . . . 1).
   Si—Input Signal (0 . . . 1).
   b. Factor Function:

$$F = \frac{2}{1 + e^{-\left(\sum_{d=1}^{Nd} Vd\right)}} - 1$$

WHERE:
   Nd—Number of Dendrons in a Neuron.
   d—Dendron index (1 . . . Dn).
   Vd—Vector of a particular dendron.
   c. Output Function:

$$So = (F \geq 0) \rightarrow \left(\frac{2}{1 + e^{-4 \cdot F}} - 1\right)$$

WHERE:
   So—Output Signal (0 . . . 1).
   F—Neuron Factor Weight (−1 . . . 1).
   d. Tuning Function:

$$Wn = Wp + \left(\frac{2}{1 + e^{-4(Si \cdot St)}} - 1\right) \cdot Tv$$

WHERE:
   Wn—New Weight (−1 . . . 1).
   Wp—Previous Weight (−1 . . . 1).
   Si—Input Signal (0 . . . 1).
   Sy—Tuning Signal (Excitatory: 0 . . . 1, Inhibitory: −1 . . . 0).
   Tv—Tuning Velocity (constant, 0 . . . 1, default 0.1).
2. Realistic Functions:
   a. Vector Function:
   V=W·Si
   WHERE:
   V—Dendron Vector (−1 . . . 1).
   W—Dendron Weight (−1 . . . 1).
   Si—Input Signal (0 . . . 1).
   b. Factor Function:

$$F = \sum_{d=1}^{Nd} Vd$$

WHERE:
   Nd—Number of Dendrons in a Neuron.
   d—Dendron index (1 . . . Dn).
   Vd—Vector of a particular dendron.
   c. Output Function:
   So=(F≥0)→F·Ov
   WHERE:
   So—Output Signal (0 . . . 1).
   F—Neuron Factor (−1 . . . 1).
   Ov—Output Velocity (constant, 0 . . . 1, default 0.5)
   d. Tuning Function:
   Wn=Wp+Si·St·Tv
   WHERE:
   Wn—New Weight (−1 . . . 1).
   Wp—Previous Weight (−1 . . . 1).

Si—Input Signal (0 . . . 1).
St—Tuning Signal (−1 . . . 1).
Tv—Tuning Velocity (constant, 0 . . . 1, default 0.1).

Tuning Pattern Calculation:

The Pattern Comparator does not perform any heavy calculations and does not require any special mathematical model. The Tuning Pattern is simply calculated by subtracting each Signal of Output Pattern from corresponding signal of Control Pattern:

$$TSn = CSn - OSn$$

WHERE:
TSn—Signal at the index 'n' of Tuning Pattern.
CSn—Signal at the index 'n' of Control Pattern.
OSn—Signal at the index 'n' of Output Pattern.

Routing Methods:

The following Routing Methods were used for experiments with real-life prototype of Domain Based Dendral Network. It is not claimed in the present invention that any routing method in particular is unique. There are variety of algorithms that can be utilized in order to distribute signals within a Layer or Domain. However, it is claimed in the present invention that usage of at least two different routing methods in combination with Domain Based Tuning is unique.

The Uniform Routing method requires that a source of the Running Signal (Input Pattern or Neural Layer) must send each Signal to all Neurons in a receiving Neural Layer. This means that the number of receivers (Dendrons) in each Neuron of the receiving Neural Layer should be equal to number of Signals in the source of the Running Signal.

The Domain Routing method requires that the number of Domains in each Neural Layer must be equal to number of the Tuning Signals received by the Network. Therefore, the size of a Domain (number of Dendrons that must be reached by each Tuning Signal in a particular Layer) should be calculated as:

$$Ds = \frac{Nn \cdot Nd}{Ns}$$

WHERE:
Ds—Size of Domain.
Nn—Number of Neurons in the Layer.
Nd—Number of Dendrons in each Neuron.
Ns—Number of Signals in Tuning Pattern.

Source of the Tuning Signal (Tuning Pattern) must send each Signal to all Dendrons in a corresponding Domain.

In summary, the following four items are presented as primary features and/or benefits of the present invention:

1. The Domain Based Dendral Network (DBDN) is a principally new model of Artificial Neural Network, which allows complex AI applications to develop that do not require any human supervision during training session.

2. The Neural Domain concept that is used by DBDN (item 1) is a unique formation that accumulates knowledge about particular patterns or classes of patterns.

3. The Domain Based Tuning (DBT) that is used in combination with the Neural Domain (item 2) is a unique tuning method that allows old algorithmic methods such as back-propagation to be eliminated.

4. The Artificial Dendron that is used by DBDN in order to implement the Domain Based Tuning is a unique element that completes an incomplete logical model of conventional Artificial Neuron.

In view of the foregoing, The Domain Based Dendral Network (DBDN) is a principally new model of Artificial Neural Network which does not use any training techniques that are based on algorithmic adjustment of a Neural Network, such as back-propagation. The DBDN is designed for development of complex AI applications that do not require any human supervision during training sessions. The learning capabilities of DBDN do not depend on complexity of the training algorithm or perfection of training procedure. In order to achieve such result DBDN uses new approach called Domain Based Tuning (DBT).

Although the invention has been explained in relation to its preferred embodiment, it is to be understood that many other possible modifications and variations can be made without departing from the spirit and scope of the invention as hereinafter claimed.

What is claimed is:

1. A domain-based dendral network comprising:
a neural network;
an input bus;
an output bus;
a pattern comparator;
a tuning bus;
the neural network comprising at least one neuron layer;
each of the at least one neuron layer comprising a plurality of neurons;
each of the plurality of neurons comprising a plurality of dendrons;
each of the plurality of dendrons being configured to receive at least one neural signal, process the at least one neural signal, and output a dendral vector based on the processing;
each of the plurality of neurons being configured to receive a plurality of dendral vectors from the plurality of dendrons, process the plurality of dendral vectors, and output an output signal based on the processing;
the input bus being communicably coupled with the neural network;
the input bus being configured to receive an input pattern and distribute the input pattern within the at least one neuron layer according to a uniform routing method, wherein a given set of signals is distributed within a given neuron layer in the uniform routing method;
the output bus being communicably coupled between the neural network and the pattern comparator;
the output bus being configured to receive an output pattern from the neural network and transmit the output pattern to the pattern comparator;
the pattern comparator being communicably coupled between the output bus and the tuning bus;
the pattern comparator being configured to receive the output pattern and a control pattern, process the output pattern and the control pattern, and produce a tuning pattern based on the processing;
the tuning bus being communicably coupled between the pattern comparator and the neural network; and
the tuning bus being configured to receive the tuning pattern from the pattern comparator and distribute the tuning pattern within at least one domain of the neural network,
wherein the tuning pattern is distributed within the neural network according to a domain routing method,
wherein each of the at least one domain is associated with at least one domain member neuron from the plurality of neurons of at least one of the at least one neuron layer, and wherein each of the at least one domain is associated with a specific class of patterns.

2. The domain-based dendral network as claimed in claim 1 comprising:
the at least one neuron layer of the neural network comprising a plurality of neuron layers;
the plurality of neuron layers comprising a first neuron layer and a last neuron layer;
the plurality of neuron layers being communicably and sequentially coupled with each other from the first neuron layer to the last neuron layer;
an arbitrary neuron layer from the plurality of neuron layers being communicably coupled with a subsequent neuron layer from the plurality of neuron layers;
the arbitrary neuron layer being configured to distribute a plurality of output signals within a subsequent neuron layer according to the uniform routing method;
the subsequent neuron layer being configured to receive the plurality of output signals, process the plurality of output signals, and output an altered plurality of output signals based on the processing;
the input bus being communicably coupled with the first neuron layer;
the input bus being configured to receive an input pattern and distribute the input pattern within the first neuron layer according to the uniform routing method;
the output bus being communicably coupled between the last neuron layer and the pattern comparator;
the output bus being configured to receive an output pattern from the last neural layer and transmit the output pattern to the pattern comparator;
the tuning bus being configured to receive the tuning pattern from the pattern comparator and distribute the tuning pattern within at least one domain of the neural network,
wherein the tuning pattern is distributed within the neural network according to a domain routing method,
wherein each of the at least one domain is associated with at least one domain member neuron from the plurality of neurons of at least one of the plurality of neuron layers.

3. The domain-based dendral network as claimed in claim 1 comprising:
the at least one neural signal comprising an input signal and at least one tuning signal;
each of the plurality of dendrons comprising a running synapse and at least one tuning synapse; and
each of the plurality of dendrons being configured to:
receive the input signal through the running synapse;
receive the at least one tuning signal through the at least one tuning synapse;
process the input signal and the at least one tuning signal; and
output the dendral vector.

4. The domain-based dendral network as claimed in claim 3 comprising:
the at least one tuning synapse comprising an excitatory synapse and an inhibitory synapse;
each of the plurality of dendrons being further configured to:
receive an excitatory signal as one of the at least one tuning signal through the excitatory synapse;
receive an inhibitory signal as one of the at least one tuning signal through the inhibitory synapse;
process the input signal and the excitatory synapse, if the excitatory synapse is received;
process the input signal and the inhibitory synapse, if the inhibitory synapse is received; and
output the dendral vector based on the processing.

5. The domain-based dendral network as claimed in claim 4 comprising:
each of the plurality of dendrons being configured to:
process the input signal and the at least one tuning signal with a tuning function in order to produce a dendral weight; and
process the input signal and the dendral weight with a vector function in order to produce the dendral vector.

6. The domain-based dendral network as claimed in claim 2 comprising:
the plurality of neurons of the arbitrary neuron layer comprising an arbitrary neuron; and
the arbitrary neuron being configured to:
receive a plurality of dendral vectors from the plurality of dendrons of the arbitrary neuron;
process the plurality of dendral vectors; and
output an output signal to the subsequent neuron layer based on the processing.

7. The domain-based dendral network as claimed in claim 6 comprising:
the arbitrary neuron being configured to:
process the plurality of dendral vectors with a factor function in order to produce a neural factor; and
process the neural factor with an output function in order to produce the output signal.

8. The domain-based dendral network as claimed in claim 7, wherein the arbitrary neuron is configured to process the plurality of dendral vectors with a factor function in order to produce the neural factor.

9. The domain-based dendral network as claimed in claim 2 comprising:
the input pattern comprising a plurality of running signals;
the input bus being configured to distribute the plurality of running signals of the input pattern within the plurality of dendrons of the plurality of neurons of the first neuron layer according to the uniform routing method;
the arbitrary neuron layer being configured to:
receive the plurality of running signals;
process the plurality of running signals;
alter the plurality of running signals based on the processing; and
distribute the plurality of running signals within the plurality of dendrons of the plurality of neurons of the subsequent neural layer according to the uniform routing method.

10. The domain-based dendral network as claimed in claim 1 comprising:
the tuning pattern comprises a plurality of tuning signals; and
the tuning bus being configured to distribute the tuning signals of the tuning pattern within the plurality of dendrons of each of the at least one domain member neuron of the at least one domain according to the domain routing method.

* * * * *